United States Patent
Yamanaka

(10) Patent No.: US 10,604,649 B2
(45) Date of Patent: Mar. 31, 2020

(54) POLYESTER RESIN COMPOSITION FOR LASER DIRECT STRUCTURING

(71) Applicant: Mitsubishi Engineering-Plastics Corporation, Minato-ku (JP)

(72) Inventor: Yasushi Yamanaka, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 0 days.

(21) Appl. No.: 15/748,766

(22) PCT Filed: Aug. 9, 2016

(86) PCT No.: PCT/JP2016/073485
§ 371 (c)(1),
(2) Date: Jan. 30, 2018

(87) PCT Pub. No.: WO2017/038409
PCT Pub. Date: Mar. 9, 2017

(65) Prior Publication Data
US 2019/0010324 A1    Jan. 10, 2019

(30) Foreign Application Priority Data

Sep. 3, 2015 (JP) ................................. 2015-173711
Sep. 3, 2015 (JP) ................................. 2015-173712

(51) Int. Cl.
*C08L 67/02*  (2006.01)
*C08L 69/00*  (2006.01)
(Continued)

(52) U.S. Cl.
CPC ............... *C08L 67/02* (2013.01); *C08K 3/22* (2013.01); *C08L 67/00* (2013.01); *C08L 69/00* (2013.01);
(Continued)

(58) Field of Classification Search
CPC ............ C08L 67/02; C08L 67/00; C08K 3/22
See application file for complete search history.

(56) References Cited

U.S. PATENT DOCUMENTS

| 5,599,592 A * | 2/1997 | Laude ..................... C23C 18/22 216/65 |
| 7,060,421 B2 * | 6/2006 | Naundorf ............... H05K 3/105 430/322 |

(Continued)

FOREIGN PATENT DOCUMENTS

| CN | 104672444 A | 6/2015 |
| EP | 2 233 519 A1 | 9/2010 |

(Continued)

OTHER PUBLICATIONS

Burton J. Sutker, Flame Retardants, 15 Ullmann's Encyclopedia of Industrial Chemistry 53-71 (published online 2000) (Year: 2000).*

(Continued)

*Primary Examiner* — Nicholas E Hill
(74) *Attorney, Agent, or Firm* — Oblon, McClelland, Maier & Neustadt, L.L.P.

(57) ABSTRACT

Provided is a polyester resin composition for laser direct structuring, which exhibits high platability and excellent mechanical properties. This polyester resin composition for laser direct structuring is characterized by containing a laser direct structuring additive (C) at a quantity of 1 to 20 parts by mass relative to a total of 100 parts by mass of a thermoplastic polyester resin (A) and a thermoplastic resin (B) having a water absorption rate of 0.15 mass % or more, as measured using the ISO 62A method.

21 Claims, 1 Drawing Sheet

(51) Int. Cl.
    *C23C 18/20*     (2006.01)
    *C08K 3/22*      (2006.01)
    *C08L 67/00*     (2006.01)
    *C08L 77/00*     (2006.01)
    *C08L 77/02*     (2006.01)

(52) U.S. Cl.
    CPC .............. *C08L 77/00* (2013.01); *C08L 77/02* (2013.01); *C23C 18/20* (2013.01); *C08L 2201/02* (2013.01); *C08L 2205/025* (2013.01); *C08L 2205/03* (2013.01); *C08L 2205/035* (2013.01)

(56)            References Cited

U.S. PATENT DOCUMENTS

| | | | |
|---|---|---|---|
| 2008/0027165 A1 | 1/2008 | Tai et al. | |
| 2013/0168133 A1 | 7/2013 | Schrauwen | |
| 2014/0002311 A1* | 1/2014 | Takano | C08J 5/043 343/700 MS |
| 2014/0147682 A1* | 5/2014 | Takano | C08K 3/2279 428/433 |
| 2014/0353543 A1* | 12/2014 | Wu | C08K 5/20 252/75 |
| 2015/0175804 A1* | 6/2015 | Aepli | C08K 3/24 428/35.7 |
| 2016/0108234 A1* | 4/2016 | Kikuchi | C09D 177/06 428/412 |
| 2016/0298242 A1* | 10/2016 | Morimoto | B29C 45/14786 |

FOREIGN PATENT DOCUMENTS

| | | | | |
|---|---|---|---|---|
| JP | 2005-231219 A | 9/2005 | | |
| JP | 2010-229410 A | 10/2010 | | |
| JP | 2011-195820 A | 10/2011 | | |
| JP | 2012-229315 A | 11/2012 | | |
| JP | 2013-144767 A | 7/2013 | | |
| JP | 2014-240452 A | 12/2014 | | |
| JP | 2015-48440 A | 3/2015 | | |
| JP | 2015-71739 A | 4/2015 | | |
| JP | 2015-120908 A | 7/2015 | | |
| WO | 2011/076729 A1 | 6/2011 | | |
| WO | 2011/076730 A1 | 6/2011 | | |
| WO | 2011/095632 A1 | 8/2011 | | |
| WO | WO-2013141157 A1 * | 9/2013 | | |
| WO | WO-2013177850 A1 * | 12/2013 | ............... | C08L 77/06 |
| WO | WO-2015005111 A1 * | 1/2015 | ......... | C23C 18/1237 |
| WO | WO-2015072373 A1 * | 5/2015 | ....... | B29C 45/14786 |
| WO | WO-2015079385 A1 * | 6/2015 | ............... | C08K 3/08 |
| WO | WO 2017/187384 | 11/2017 | | |

OTHER PUBLICATIONS

Richard L. Macary & Robert Hamilton, "SelectConect(TM) Process for Metallizing Circuits on Molded Parts and Components," Metal Finishing, Mar. 2010, at 35-37 (Year: 2010).*

International Search Report dated Nov. 15, 2016 in PCT/JP2016/73485 filed Aug. 9, 2016.

Supplementary European Search Report dated May 20, 2019, in corresponding European Patent Application 16 841 441.5.

Office Action dated Apr. 30, 2019, in corresponding Chinese patent Application No. 201680051172.9.

* cited by examiner

POLYESTER RESIN COMPOSITION FOR LASER DIRECT STRUCTURING

TECHNICAL FIELD

The present invention relates to a polyester resin composition for laser direct structuring, and more specifically relates to a polyester resin composition for laser direct structuring, which exhibits high platability and excellent mechanical properties.

BACKGROUND ART

Thermoplastic polyester resins such as polybutylene terephthalate and polyethylene terephthalate exhibit excellent mechanical strength, chemical resistance, electrical insulating properties, and the like, and also exhibit excellent heat resistance, moldability and recyclability, and are therefore widely used in components for electrical and electronic equipment, and components for motor vehicles, and also in electrical equipment components, mechanical components, and the like.

The spread of multifunctional portable terminals such as smartphones has been rapid in recent years, and thermoplastic polyester resins are widely used in components thereof. Because multifunctional portable terminals have been improved significantly in the function and in the performance and reduced in the weight, size and thickness, antennas required for portable terminals are formed as circuits inside portable terminals. Antenna circuits are formed as electrically conductive metal circuit patterns, but the insides of portable terminals and the like are shaped narrow and complicated, and in cases where antenna circuits are formed in such places, circuit patterns are three-dimensional patterns.

In order to form a circuit pattern on the surface of a resin product that is not electrically conductive, one method is to use ordinary electroless plating, in which a surface of a molded article is etched with an acid, a catalyst is applied and used as a catalyst for subsequent electroless plating (chemical plating), the molded article is immersed in an electroless plating liquid so as to form an electrically conductive layer, and a variety of metals are then plated so as to form a circuit pattern. This method has the drawback of requiring a complex process involving acid treatment, neutralization treatment, catalyst formation and catalyst activation.

A method that has attracted a great deal of interest in recent years is a method known as laser direct structuring (hereinafter also referred to as LDS). In this method, a surface of a molded article comprising a resin material containing a metal compound is irradiated with a laser in the shape of a circuit pattern, an activated metal layer is formed only on those regions of the surface of the molded article on which the circuit pattern is to be provided, thereby facilitating plating treatment, and plating is then carried out by means of electroless plating (or electroplating) using copper, nickel, gold, or the like, so as to construct a circuit pattern. Such LDS techniques are disclosed in PTL 1 to 3, for example.

However, even when LDS is applied to a thermoplastic polyester resin, there is a drawback that it is difficult for a plating to produce. This drawback is not ameliorated if the laser irradiation intensity is increased or decreased. In the invention disclosed in PTL 4, talc is blended in order to improve platability (see paragraph [0048]; Examples). However, this method has the problem that the mechanical properties (especially brittleness) of the product deteriorate.

CITATION LIST

Patent Literature

[PTL 1] WO 2011/095632
[PTL 2] WO 2011/076729
[PTL 3] WO 2011/076730
[PTL 4] Japanese Patent Application Publication No. 2010-229410

SUMMARY OF INVENTION

Technical Problem

The purpose of (problem to be addressed by) the present invention is to solve the problems mentioned above and provide a polyester resin composition for laser direct structuring, which exhibits high platability and excellent mechanical properties and also exhibits excellent flame retardancy.

Solution to Problem

The inventor of the present invention has found that high platability and excellent mechanical properties are exhibited by a polyester resin composition for laser direct structuring, which is obtained by incorporating a laser direct structuring additive in a resin composition obtained by blending a thermoplastic resin (B) having a water absorption rate of 0.15 mass % or more, as measured using the ISO 62A method, in a thermoplastic polyester resin.

The present invention is as follows.

[1] A polyester resin composition for laser direct structuring, containing a laser direct structuring additive (C) at a quantity of 1 to 20 parts by mass relative to a total of 100 parts by mass of a thermoplastic polyester resin (A) and a thermoplastic resin (B) having a water absorption rate of 0.15 mass % or more, as measured using the ISO 62A method.

[2] The polyester resin composition according to [1] above, wherein a ratio of content of the thermoplastic resin (B) is 1 to 50 mass % relative to a total of 100 mass % of components (A) and (B).

[3] The polyester resin composition according to [1] or [2] above, wherein the laser direct structuring additive (C) is a copper-chromium oxide or an antimony-containing tin oxide.

[4] The polyester resin composition according to any one of [1] to [3] above, further containing a flame retardant (D) at a quantity of 3 to 60 parts by mass relative to a total of 100 parts by mass of components (A) and (B).

[5] The polyester resin composition according to any one of [1] to [4] above, wherein the flame retardant (D) is a brominated polyphenylene ether.

[6] The polyester resin composition according to [1] or [2] above, wherein the thermoplastic resin (B) is a polyamide resin or a polycarbonate resin.

[7] The polyester resin composition according to [1] above, wherein the thermoplastic polyester resin (A) is a polybutylene terephthalate resin.

Advantageous Effects of Invention

The polyester resin composition for laser direct structuring of the present invention exhibits high platability and excellent mechanical properties.

Explanations as to why the polyester resin composition of the present invention achieves such effects are as yet insufficient. However, it is thought that by blending the thermoplastic resin (B) that has a higher water absorption rate than the thermoplastic polyester resin (A), an activated metal layer is formed on a surface of a molded article by means of laser irradiation, and when this activated metal layer is immersed in a plating liquid so as to laminate a metal by means of electroless plating, the activated metal layer absorbs metal ion-containing water in the plating liquid, thereby improving the metal lamination efficiency and enabling a thick metal layer to be formed in a short time.

DESCRIPTION OF EMBODIMENTS

Figure 1:
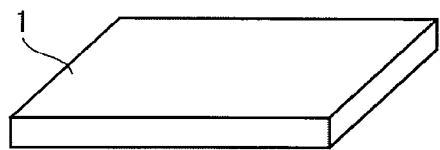
FIG. 1 is a schematic diagram of a cuboid iron insert object used in order to evaluate alkali resistance in the examples.

Details of the present invention will now be explained in detail.

Explanations of the constituent features described below are based on representative embodiments and specific examples of the present invention, but it should be understood that the present invention is not limited to such embodiments or specific examples. Moreover, use of "to" to indicate a range in the present specification means that numerical values mentioned before and after the "to" include the lower limit and upper limit thereof.

The polyester resin composition for laser direct structuring contains a laser direct structuring additive (C) at a quantity of 1 to 20 parts by mass relative to a total of 100 parts by mass of a thermoplastic polyester resin (A) and a thermoplastic resin (B) having a water absorption rate of 0.15 mass % or more, as measured using the ISO 62A method.

[Thermoplastic Polyester Resin (A)]

The thermoplastic polyester resin (A) that is the primary component of the resin composition of the present invention is a polyester obtained by polycondensation of a dicarboxylic acid compound and a dihydroxy compound, polycondensation of an oxycarboxylic acid compound or polycondensation of these compounds, and may be a homopolyester or copolyester.

The dicarboxylic acid compound that constitutes the thermoplastic polyester resin (A) is preferably an aromatic dicarboxylic acid or an ester-forming derivative thereof.

Examples of aromatic dicarboxylic acids include terephthalic acid, isophthalic acid, orthophthalic acid, 1,5-naphthalenedicarboxylic acid, 2,5-naphthalenedicarboxylic acid, 2,6-naphthalenedicarboxylic acid, biphenyl-2,2'-dicarboxylic acid, biphenyl-3,3'-dicarboxylic acid, biphenyl-4,4'-dicarboxylic acid, diphenyl ether-4,4'-dicarboxylic acid, diphenylmethane-4,4'-dicarboxylic acid, diphenylsulfone-4,4'-dicarboxylic acid, diphenylisopropylidene-4,4'-dicarboxylic acid, 1,2-bis(phenoxy)ethane-4,4'-dicarboxylic acid, anthracene-2,5-dicarboxylic acid, anthracene-2,6-dicarboxylic acid, p-terphenylene-4,4'-dicarboxylic acid and pyridine-2,5-dicarboxylic acid. Of these, terephthalic acid can be advantageously used.

It is possible to use a mixture of two or more of these aromatic dicarboxylic acids. As is well known, these aromatic dicarboxylic acids can be used in polycondensation reactions as ester-forming derivatives such as dimethyl esters in addition to free acids.

Moreover, small quantities of one or more aliphatic dicarboxylic acids such as adipic acid, azelaic acid, dodecanedioic acid and sebacic acid and alicyclic dicarboxylic acids such as 1,2-cyclohexanedie carboxylic acid, 1,3-cyclohexanedicarboxylic acid and 1,4-cyclohexanedicarboxylic acid can be used together with these aromatic dicarboxylic acids.

Examples of the dihydroxy compound that constitutes the thermoplastic polyester resin (A) include aliphatic diols such as ethylene glycol, propylene glycol, butane diol, hexylene glycol, neopentyl glycol, 2-methylpropane-1,3-diol, diethylene glycol and triethylene glycol, and alicyclic diols such as cyclohexane-1,4-dimethanol, and a mixture thereof. Moreover, it is possible to copolymerize a small quantity of one or more long chain diols having molecular weights of 400 to 6,000, such as polyethylene glycol, poly-1,3-propylene glycol and polytetramethylene glycol.

In addition, it is possible to use an aromatic diol such as hydroquinone, resorcin, naphthalene diol, dihydroxydiphenyl ether or 2,2-bis(4-hydroxyphenyl)propane.

In addition to difunctional monomers such as those mentioned above, it is possible to additionally use a small quantity of a trifunctional monomer, such as trimellitic acid, trimesic acid, or trimethylolpropane; and pyromellitic acid, pentaerythritol in order to introduce a branched structure, or a monofunctional compound such as a fatty acid in order to adjust molecular weight.

A resin comprising mainly a polycondensation product of a dicarboxylic acid and a diol, that is, a resin containing 50 mass or more, preferably 70 mass or more is generally used as the thermoplastic polyester resin (A). The dicarboxylic acid is preferably an aromatic carboxylic acid, and the diol is preferably an aliphatic diol.

Of these, a polyalkylene terephthalate in which 95 mol. % or more of the acid component is terephthalic acid and 95 mass % or more of the alcohol component is an aliphatic diol is preferred. Polybutylene terephthalate and polyethylene terephthalate are representative examples thereof. These are preferably close to homopolyesters, that is, polyesters in which 95 mass % or more of the overall resin comprises a terephthalic acid component and a 1,4-butane diol component or ethylene glycol component.

The intrinsic viscosity of the thermoplastic polyester resin (A) is preferably 0.3 to 2 dl/g. If a resin having an intrinsic viscosity of less than 0.3 dl/g is used, the obtained resin composition tends to have low mechanical strength. In addition, if a resin having an intrinsic viscosity of more than 2 dl/g is used, the fluidity and moldability of the resin composition may deteriorate. From the perspectives of moldability and mechanical properties, the intrinsic viscosity is more preferably 0.4 dl/g or more, further preferably 0.5 dl/g or more, and particularly preferably 0.6 dl/g or more, and is more preferably 1.5 dl/g or less, further preferably 1.2 dl/g or less, and particularly preferably 0.8 dl/g or less.

Moreover, the intrinsic viscosity of the thermoplastic polyester resin (A) is a value measured at 30° C. in a mixed solvent comprising tetrachloroethane and phenol at a mass ratio of 1:1.

The amount of terminal carboxyl groups in the thermoplastic polyester resin (A) can be selected and decided as appropriate, but is generally 60 eq/ton or less, preferably 50 eq/ton or less, and more preferably 30 eq/ton or less. If this amount exceeds 50 eq/ton, gas is readily generated during melt mold processing the resin composition. The lower limit for the amount of terminal carboxyl groups is not particularly limited, but is generally 3 eq/ton, preferably 5 eq/ton, and more preferably 10 eq/ton.

Moreover, the amount of terminal carboxyl groups in the thermoplastic polyester resin (A) is a value obtained by dissolving 0.5 g of resin in 25 mL of benzyl alcohol, and titrating using a 0.01 mol/L benzyl alcohol solution of sodium hydroxide. A method for adjusting the amount of terminal carboxyl groups can be a conventional publicly known method, such as a method comprising adjusting polymerization conditions such as the charging ratios of raw materials when polymerizing, the polymerization temperature or the pressure reduction method, or a method comprising reacting a terminal-blocking agent.

Of these, the thermoplastic polyester resin (A) is preferably a resin that contains a polybutylene terephthalate resin, and it is preferable for 50 mass % or more of the thermoplastic polyester resin (A) to be a polybutylene terephthalate resin.

The polybutylene terephthalate resin can be produced by melt-polymerizing a dicarboxylic acid component containing terephthalic acid as a primary component or an ester derivative thereof, and a diol component containing 1,4-butane diol as a primary component in a batch or continuous melt polymerization. In addition, it is possible to increase the degree of polymerization (or molecular weight) to a desired value by producing a low molecular weight polybutylene terephthalate resin by means of melt polymerization and then carrying out solid state polymerization in a nitrogen stream or under reduced pressure.

The method for producing the polybutylene terephthalate resin is preferably a production method comprising subjecting a dicarboxylic acid component containing terephthalic acid as a primary component and a diol component containing 1,4-butane diol as a primary component to continuous melt polymerization.

A catalyst used for carrying out an esterification reaction may be a conventionally known catalyst. For example, it may be a titanium compound, a tin compound, a magnesium compound or a calcium compound. Of these, titanium compounds are particularly preferred. Specific examples of titanium compounds used as esterification catalysts include titanium alcoholates, such as tetramethyl titanate, tetraisopropyl titanate and tetrabutyl titanate; and titanium phenolates such as tetraphenyl titanate.

The polybutylene terephthalate resin may be a polybutylene terephthalate resin that is modified by means of copolymerization (hereinafter also referred to as a "modified polybutylene terephthalate resin"), but preferred specific examples of such copolymers include polyester-ether resins obtained by copolymerizing with a polyalkylene glycol (and especially polytetramethylene glycol), polybutylene terephthalate resins copolymerized with dimer acids, and polybutylene terephthalate resins copolymerized with isophthalic acid.

A polybutylene terephthalate resin whose crystallinity is reduced by introducing a copolymer component is preferred from the perspectives of improved water absorption rate and improved platability.

In cases where a polyester-ether resin obtained by copolymerizing with polytetramethylene glycol is used as the modified polybutylene terephthalate resin, the proportion of the tetramethylene glycol component in the copolymer is preferably 3 to 40 mass %, more preferably 5 to 30 mass %, and further preferably 10 to 25 mass %.

In cases where a polybutylene terephthalate resin copolymerized with a dimer acid is used as the modified polybutylene terephthalate resin, the proportion of the dimer acid component relative to all carboxylic acid components is preferably 0.5 to 30 mol. %, more preferably 1 to 20 mol. %, and further preferably 3 to 15 mol. %, in terms of carboxylic acid groups.

In cases where a polybutylene terephthalate resin copolymerized with isophthalic acid is used as the modified polybutylene terephthalate resin, the proportion of the isophthalic acid component relative to all carboxylic acid components is preferably 1 to 30 mol. %, more preferably 1 to 20 mol. %, and further preferably 3 to 15 mol. %, in terms of carboxylic acid groups.

Of these modified polybutylene terephthalate resins, polyester-ether resins obtained by copolymerizing with polytetramethylene glycol and polybutylene terephthalate resins copolymerized with isophthalic acid are preferred.

The intrinsic viscosity of the polybutylene terephthalate resin is preferably 0.5 to 2 dl/g. From the perspectives of moldability and mechanical properties, it is more preferable for the intrinsic viscosity to fall within the range 0.6 to 1.5 dl/g. If a resin having an intrinsic viscosity of less than 0.5 dl/g is used, the obtained resin composition tends to have low mechanical strength. If a resin having an intrinsic viscosity of more than 2 dl/g is used, the fluidity and moldability of the resin composition may deteriorate.

Here, the intrinsic viscosity is a value measured at 30° C. in a mixed solvent comprising tetrachloroethane and phenol at a mass ratio of 1:1.

The amount of terminal carboxyl groups in the polybutylene terephthalate resin can be selected and decided as appropriate, but is generally 60 eq/ton or less, preferably 50 eq/ton or less, more preferably 40 eq/ton or less, and further preferably 30 eq/ton or less. If this amount exceeds 50 eq/ton, gas is readily generated during melt mold processing the resin composition. The lower limit for the amount of terminal hydroxyl groups is not particularly limited, but is generally 10 eq/ton in view of productivity in production of the polybutylene terephthalate resin.

The amount of terminal carboxyl groups in the polybutylene terephthalate resin is a value obtained by dissolving 0.5 g of polybutylene terephthalate resin in 25 mL of benzyl alcohol, and titrating using a 0.01 mol/L benzyl alcohol solution of sodium hydroxide. A method for adjusting the amount of terminal carboxyl groups may be a conventional publicly known method, such as a method comprising adjusting polymerization conditions such as the charging ratios of raw materials when polymerizing, the polymerization temperature or the pressure reduction method, or a method comprising reacting a terminal-blocking agent.

The thermoplastic polyester resin (A) preferably contains a polybutylene terephthalate homopolymer and the modified polybutylene terephthalate resin. Incorporating a specific quantity of a modified polybutylene terephthalate resin is preferable from the perspectives of improving weld strength, alkali resistance and resistance to heat shock after plating processing.

In cases where a polybutylene terephthalate homopolymer and a modified polybutylene terephthalate resin are contained, the content of the modified polybutylene terephthalate resin is preferably 5 to 50 mass %, more preferably 10 to 40 mass %, and further preferably 15 to 30 mass %, relative to a total of 100 mass % of the polybutylene terephthalate homopolymer and modified polybutylene terephthalate resin.

Furthermore, the thermoplastic polyester resin (A) preferably contains a polybutylene terephthalate resin and a polyethylene terephthalate resin. Incorporating a specific quantity of a polyethylene terephthalate resin is preferable from the perspective of improving weld strength.

In cases where a polybutylene terephthalate resin and a polyethylene terephthalate resin are contained, the content of the polyethylene terephthalate resin is preferably 5 to 50 mass %, more preferably 10 to 45 mass %, and further preferably 15 to 40 mass %, relative to a total of 100 mass % of the polybutylene terephthalate resin and polyethylene terephthalate resin.

The polyethylene terephthalate resin is a resin having, as primary constituent units, oxyethyleneoxyterephthaloyl units comprising terephthalic acid and ethylene glycol as all constituent repeating units, and may contain constituent repeating units other than oxyethyleneoxyterephthaloyl units. The polyethylene terephthalate resin is produced using terephthalic acid or a lower alkyl ester thereof and ethylene glycol as primary raw materials. Other acid components and/or other glycol components may be additionally used as raw materials.

Examples of acid components other than terephthalic acid include dicarboxylic acids and derivatives thereof, such as phthalic acid, isophthalic acid, naphthalenedicarboxylic acid, 4,4'-diphenylsulfonedicarboxylic acid, 4,4f-biphenyldicarboxylic acid, 1,4-cyclohexanedicarboxylic acid, 1,3-phenylenedioxydiacetic acid and structural isomers thereof, malonic acid, succinic acid and adipic acid; and oxyacids and derivatives thereof, such as p-hydroxybenzoic acid and glycolic acid.

Examples of diol components other than ethylene glycol include aliphatic glycols such as 1,2-propane diol, 1,3-propane diol, 1,4-butane diol, pentamethylene glycol, hexamethylene glycol and neopentyl glycol; alicyclic glycols such as cyclohexanedimethanol; and aromatic dihydroxy compound derivatives such as bisphenol A and bisphenol S.

The polyethylene terephthalate resin may be obtained by copolymerizing 1.0 mol. % or less, preferably 0.5 mol. % or less, and more preferably 0.3 mol. % or less, of a branched component, for example a trifunctional component such as tricarballylic acid, trimelissic acid or trimellitic acid; a tetrafunctional acid having ester-forming capacity, such as pyromellitic acid; or a trifunctional or tetrafunctional alcohol having ester-forming capacity, such as glycerin, trimethylolpropane or pentaerythritol.

The intrinsic viscosity of the polyethylene terephthalate resin is preferably 0.3 to 1.5 dl/g, more preferably 0.3 to 1.2 dl/g, and particularly preferably 0.4 to 0.8 dl/g.

The intrinsic viscosity of the polyethylene terephthalate resin is a value measured at 30° C. in a mixed solvent comprising tetrachloroethane and phenol at a mass ratio of 1:1.

The concentration of terminal carboxyl groups in the polyethylene terephthalate resin is 3 to 50 eq/ton, preferably 5 to 40 eq/ton, and more preferably 10 to 30 eq/ton.

The concentration of terminal carboxyl groups in the polyethylene terephthalate resin is a value obtained by dissolving 0.5 g of polyethylene terephthalate resin in 25 mL of benzyl alcohol, and titrating using a 0.01 mol/L benzyl alcohol solution of sodium hydroxide.

A method for adjusting the amount of terminal carboxyl groups can be a conventional publicly known method, such as a method comprising adjusting polymerization conditions such as the charging ratios of raw materials when polymerizing, the polymerization temperature or the pressure reduction method, or a method comprising reacting a terminal-blocking agent.

[Thermoplastic Resin (B)]

The polyester resin composition for laser direct structuring of the present invention contains a thermoplastic resin (B) having a water absorption rate of 0.15 mass % or more, as measured using the ISO 62A method.

The water absorption rate is preferably 0.20 mass % or more, and more preferably 0.4 mass % or more, and the upper limit of the water absorption rate is not limited, but is generally 5 mass % or less, and preferably 4 mass % or less.

The water absorption rate is a value obtained in accordance with the ISO 62A method by immersing the resin in water at 23° C. for 24 hours and then measuring the water absorption rate, and is measured using a 60 mm square plate-like test piece having a thickness of 3.0 mm, and is a mass percentage determined from the percentage increase in mass after water absorption relative to the original mass (100%) of the test piece.

Preferred examples of the thermoplastic resin (B) include polyamide resins (water absorption rate: 0.4% to 4%), polycarbonate resins (0.24%), polyoxymethylene resins (0.25%), polyimide resins (0.3%), polyamideimide resins (0.28%), polymethylmethacrylate resins (0.3%) and ABS resins (0.3%). Incidentally, polybutylene terephthalate resins have water absorption rates of 0.09%, and polyethylene terephthalate resins have water absorption rates of 0.10%.

In the present invention, a combination of a thermoplastic polyester resin (A) having a water absorption rate of less than 0.15 mass % and a thermoplastic resin (B) having a water absorption rate of 0.15 mass % or more is preferred, and the advantageous effects mentioned above can be better exhibited by blending a polyamide resin and a polycarbonate resin in particular with the thermoplastic polyester resin (A).

[Polyamide Resin]

Polyamide resin means a polymer obtained by ring opening polymerization of a lactam compound, a polymer obtained by polycondensation of a diaminocarboxylic acid, or a polymer obtained by polycondensation of an amine compound and a dibasic acid or similar compound. Examples of lactam compounds include propiolactam, α-pyrrolidone, ε-caprolactam, enantolactam, ω-laurolactam and cyclododecalactam, and examples of diaminocarboxylic acids include aminocaproic acid, 7-aminoheptanoic acid, 11-aminoundecanoic acid and 9-aminononanoic acid. Examples of amine compounds include hexamethylenediamine, metaxylylenediamine and paraxylylenediamine, and examples of dibasic acids include terephthalic acid, isophthalic acid, adipic acid, sebacic acid, dodecane dibasic acid, and glutaric acid.

More specifically, the examples include polyamide 4, polyamide 6, polyamide 7, polyamide 8, polyamide 11, polyamide 12, polyamide 66, polyamide 69, polyamide 610, polyamide 611, polyamide 612, polyamide 6T, polyamide 6/66, polyamide 6/12, polyamide 6/6T, polyamide 6/6I, polyamide 6I/6T, polycondensates of meta-xylylenediamine and adipic acid (polyamide MXD6) and polycondensates of mixed diamines comprising meta-xylylenediamine and para-xylylenediamine and adipic acid (polyamide MP6). It is possible to use one of these polyamide resins in isolation, or a mixture of two or more types thereof. Of these, a polyamide resin whose melting point is not particularly different from the melting point of the thermoplastic polyester resin (A) is preferred, and in the case of a polybutylene terephthalate resin, polyamide 6, polyamide 6/66 copolymers, polyamide 66 and polyamide MXD6 are preferred.

Aliphatic polyamide resins such as polyamide 6 and polyamide 66 are more preferred, and polyamide 6 is most preferred.

The relative viscosity of the polyamide resin is the relative viscosity measured at a temperature of 25° C. at a concentration of 1 mass % in 98% sulfuric acid, and is generally 1.6 to 4, and preferably 2 to 3.8. If this relative viscosity is less than 1.6, the obtained resin composition tends to be brittle, but if this relative viscosity is greater than a 4, the fluidity of the resin composition during molding may be insufficient.

The content of terminal carboxyl groups in the polyamide resin can be selected and decided as appropriate, but is preferably 35 μeq/g or more, more preferably 40 μeq/g or more, further preferably 45 μeq/g or more, and particularly preferably 50 μeq/g or more. The upper limit thereof is generally 140 μeq/g, preferably 130 μeq/g, and more preferably 120 μeq/g. The content of terminal amino groups is preferably 10 μeq/g or more, more preferably 15 μeq/g or more, and further preferably 20 μeq/g or more, and the upper limit thereof is generally 100 μeq/g, preferably 80 μeq/g, and more preferably 70 μeq/g. Specifying such terminal group content values is preferable from the perspectives of improving alkali resistance and resistance to heat shock.

The content of terminal carboxyl groups in the polyamide resin can be measured by dissolving the polyamide resin in benzyl alcohol and then titrating with 0.01 N caustic soda. The content of terminal amino groups can be measured by dissolving the polyamide resin in phenol and then titrating with 0.01 N hydrochloric acid. Methods for adjusting the amount of terminal carboxyl groups and terminal amino groups can be conventional publicly known methods, such as a method comprising adjusting polymerization conditions such as the charging ratios of raw materials when polymerizing, the polymerization temperature or the pressure reduction method, or a method comprising reacting a terminal-blocking agent.

[Polycarbonate Resin]

The polycarbonate resin is an optionally branched thermoplastic polymer or copolymer obtained by reacting a dihydroxy compound or a combination of dihydroxy compound and a small quantity of a polyhydroxy compound with phosgene or a carbonic acid diester.

The method for producing the polycarbonate resin is not particularly limited, and it is possible to use a conventional publicly known interfacial polymerization method or melt process (a transesterification process).

The dihydroxy compound raw material is preferably an aromatic dihydroxy compound. Specific examples thereof include 2,2-bis(4-hydroxyphenyl)propane (that is, bisphenol A), tetramethylbisphenol A, bis(4-hydroxyphenyl)-p-diisopropylbenzene, hydroquinone, resorcinol and 4,4-dihydroxydiphenyl. Of these, bisphenol A is preferred. It is possible to use a compound in which one or more tetraalkyl phosphonium sulfonates are bonded to the aromatic dihydroxy compound.

Among those mentioned above, the polycarbonate resin is preferably an aromatic polycarbonate resin derived from 2,2-bis(4-hydroxyphenyl)propane or an aromatic polycarbonate copolymer derived from 2,2-bis(4-hydroxyphenyl) propane and another aromatic dihydroxy compound. The polycarbonate resin may also be a copolymer comprising mainly an aromatic polycarbonate resin, such as a copolymer of an aromatic polycarbonate and a polymer or oligomer having a siloxane structure. Furthermore, it is possible to use a mixture of two or more the polycarbonate resins mentioned above.

A monovalent aromatic hydroxy compound can be used in order to adjust the molecular weight of the polycarbonate resin, and examples of such compounds include m- and p-methylphenol, m- and p-propylphenol, p-tert-butylphenol and p-long chain alkyl-substituted phenol compounds.

The viscosity average molecular weight Mv of the polycarbonate resin is preferably 5,000 to 30,000, more preferably 10,000 to 28,000, and further preferably 14,000 to 24,000. If a polycarbonate resin having a viscosity average molecular weight of less than 5,000 is used, the obtained molded article tends to have low mechanical strength. If a polycarbonate resin having a viscosity average molecular weight of more than 30,000 is used, the fluidity and moldability of the resin material may deteriorate. The viscosity average molecular weight of the polycarbonate resin is the viscosity average molecular weight [Mv] calculated from the solution viscosity measured at a temperature of 25° C. using methylene chloride as a solvent.

The ratio (Mw/Mn) of the mass average molecular weight Mw to the number average molecular weight Mn, as calculated in terms of polystyrene and measured by means of gel permeation chromatography (GPC), of the polycarbonate resin is preferably 2 to 5, and more preferably 2.5 to 4. If the value of Mw/Mn is too low, the fluidity of the resin in a molten state increases and moldability tends to deteriorate. If the value of Mw/Mn is too high, the melt viscosity of the resin increases and molding tends to be difficult.

From perspectives such as thermal stability, stability to hydrolysis and color tone, the quantity of terminal hydroxyl groups in the polycarbonate resin is preferably 100 ppm by mass or more, more preferably 200 ppm by mass or more, further preferably 300 ppm by mass or more, particularly preferably 400 ppm by mass or more, and most preferably 500 ppm by mass or more. The quantity of terminal hydroxyl groups in the polycarbonate resin is generally 1,500 ppm by mass or less, preferably 1,300 ppm by mass or less, further preferably 1,200 ppm by mass or less, particularly preferably 1,100 ppm by mass or less, and most preferably 1,000 ppm by mass or less. If the quantity of terminal hydroxyl groups in the polycarbonate resin is too low, compatibility with the thermoplastic polyester decreases. In addition, initial color tone may deteriorate at the time of molding the resin. If the quantity of terminal hydroxyl groups in the polycarbonate resin is too high, residual heat stability and resistance to wet heat tend to deteriorate.

The ratio of content of the thermoplastic resin (B) is preferably 1 to 50 mass %, more preferably 5 mass % or more, further preferably 10 mass % or more, and particularly preferably 15 mass % or more, relative to a total of 100 mass % of the thermoplastic polyester resin (A) and the thermoplastic resin (B). If the ratio of content of the thermoplastic resin (B) is less than 1 mass %, it is difficult to achieve the advantageous effects of the present invention, and if the ratio of content of the thermoplastic resin (B) exceeds 50 mass %, the effects may be unfavorable. For example, dispersion of the thermoplastic resin (B) may be poor, and mechanical properties, dimensional stability and moldability may deteriorate.

[Laser Direct Structuring Additive (C)]

The resin composition of the present invention contains a laser direct structuring (LDS) additive (C). When the LDS additive is irradiated with a laser beam, metal atoms are activated to form a metal layer on the surface. Preferred examples of the LDS additive (C) include spinel type heavy metal composite oxides such as copper-chromium oxide ($CuCr_2O_4$); copper salts such as copper hydroxide-phosphoric acid salts, copper phosphate, copper sulfate and copper thiocyanate; and antimony-containing tin oxides such as antimony-doped tin oxides. Of these, copper-chromium oxide and antimony-containing tin oxides are more preferred.

Since the copper-chromium oxide also functions as a black pigment, it is preferred in cases where a black molded article is to be obtained. Since the antimony-containing tin oxides can be used as white pigments, it can be used in white molded articles or used in combination with pigments of other colors so as to obtain a desired color variation.

The particle diameter of the LDS additive (C) is preferably 0.01 to 50 μm, and more preferably 0.05 to 30 μm. By specifying such a particle diameter, the uniformity of the plating surface state tends to be improved when carrying out plating.

The content of the LDS additive (C) is 1 to 20 parts by mass, preferably 3 parts by mass or more, and more preferably 5 parts by mass or more, and is preferably 17 parts by mass or less, and more preferably 15 parts by mass or less, relative to a total of 100 parts by mass of the thermoplastic polyester resin (A) and the thermoplastic resin (B).

A surface of a molded article formed by injection molding or the like of a resin composition that contains the components mentioned above is irradiated with a laser beam so as to form a pattern having a desired shape, such as an antenna circuit. By configuring in this way, an activated metal layer is formed only on those regions of the surface of the molded article on which the circuit pattern is to be provided, and a surface structure that is advantageous for subsequent metal plating is formed. The molded article is immersed in a plating liquid, plating is then carried out by means of electroless plating (or electroplating) using copper, nickel, gold, or the like, whereby a circuit pattern is formed.

[Flame Retardant (D)]

It is preferable for the polyester resin composition of the present invention to contain a flame retardant. A variety of flame retardants, such as halogenated flame retardants, phosphorus flame retardants and silicone-based flame retardants can be used as flame retardants for polyester resins, and it is preferable to incorporate a halogenated flame retardant or a phosphorus flame retardant.

Specific examples of preferred halogenated flame retardants include brominated polycarbonate resins, brominated epoxy resins, brominated phenoxy resins, brominated polyphenylene ether resins, brominated polystyrene resins, brominated bisphenol A, brominated bisphenol A glycidyl ethers, pentabromobenzyl polyacrylate and brominated imides (brominated phthalimide and the like), and of these, brominated flame retardants are preferred. Brominated polyphenylene ether resins, brominated polycarbonate resins, brominated polystyrene resins, brominated bisphenol A glycidyl ethers and pentabromobenzyl polyacrylate are more preferred from the perspective of facilitating suppression of a deterioration in impact resistance. Of these, brominated polyphenylene ether is particularly preferred. Brominated polyphenylene ether exhibits better specific LDS platability, flame retardancy and alkali resistance than other types of flame retardants.

Further examples of bromineated flame retardants include a brominated phthalimide such as N,N'-ethylene-bis(tetrabromophthalimide), a brominated epoxy resin such as an epoxidated tetrabromobisphenol A, a brominated polycarbonate such as a tetrabromobisphenol A polycarbonate, a brominated polyacrylate such as polypentabromo acrylate or polypentabromobenzyl acrylate, decabromodiphenyl ether or decabromodiphenylethane. These flame retardants can be used according to the intended use of the resin, although they may rarely satisfy all of the above-mentioned three features.

Examples of brominated polyphenylene ether include 1) brominated polyphenylene ether obtained by brominating a polyphenylene ether, or 2) brominated polyphenylene ether obtained by highly polymerizing monobromophenol, dibromophenol, tribromophenol, tetrabromophenol, pentabromophenol, or the like, as a raw material. Methods for producing this type of brominated polyphenylene ether are publicly known, and it is possible to use a method such as that disclosed in, for example, Japanese Examined Patent Publication No. S56-2100 or Japanese Patent Application Publication No. H07-278290.

The molecular weight of the brominated polyphenylene ether is, in terms of mass average molecular weight (Mw), preferably 1,000 to 50,000, more preferably 1,000 to 30,000, and further preferably 1,000 to 20,000. In addition, the bromine content is preferably 55 wt. % or more.

The terminal structure of the brominated polyphenylene ether is not particularly limited, and terminal groups may be OH groups, carboxyl groups, or the like, and may be in the form of metal salts.

The content of the brominated polyphenylene ether is preferably 3 to 60 parts by mass relative to a total of 100 parts by mass of the thermoplastic polyester resin (A) and the thermoplastic resin (B). The advantageous effects of the present invention are difficult to achieve if this content is less than 3 parts by mass, and if this content is greater than 60 parts by mass, poor dispersion of the brominated polyphenylene ether and a deterioration in mechanical properties and moldability may occur. This content is more preferably 4 parts by mass or more, further preferably 5 parts by mass or more, and particularly preferably 10 parts by mass or more, and is more preferably 50 parts by mass or less, further preferably 45 parts by mass or less, and particularly preferably 40 parts by mass or less.

[Elastomer]

In addition to the components mentioned above, the resin composition of the present invention preferably contains an elastomer. By incorporating an elastomer, it is possible to improve the impact resistance of the resin composition.

The elastomer used in the present invention is preferably a graft copolymer obtained by graft copolymerizing a rubber component and a monomer component copolymerizable with the rubber component. The method for producing the graft copolymer can be bulk polymerization, solution polymerization, suspension polymerization, emulsion polymerization, or the like, and the copolymerization method may be single stage graft copolymerization or multistage graft copolymerization.

The glass transition temperature of the rubber component is generally 0° C. or lower, preferably −20° C. or lower, and more preferably −30° C. or lower. Specific examples of the rubber component include polyalkylacrylate rubbers such as polybutadiene rubbers, polyisoprene rubbers, polybutyl acrylate, poly(2-ethylhexyl acrylate) and butyl acrylate.2-ethylhexyl acrylate copolymers, silicone-based rubbers such as polyorganosiloxane rubbers, butadiene-acrylic composite rubbers, Interpenetrating Polymer Network (IPN) composite rubbers comprising polyorganosiloxane rubbers and polyalkyl acrylate rubbers, styrene-butadiene rubbers, ethylene-α-olefin rubbers such as ethylene-propylene rubbers, ethylene-butene rubbers and ethylene-octene rubbers, ethylene-acrylic rubbers and fluoro-rubbers. It is possible to use one of these rubber components in isolation, or a mixture of two or more types thereof. Of these, polybutadiene rubbers, polyalkylacrylate rubbers, polyorganosiloxane rubbers, IPN composite rubbers comprising polyorganosiloxane rubbers and polyalkylacrylate rubbers, and styrene-butadiene rubbers are preferred from the perspectives of mechanical properties and surface appearance.

Specific examples of the monomer component that can be graft copolymerized with the rubber component include aromatic vinyl compounds, vinyl cyanide compounds, (meth)acrylic acid ester compounds, (meth)acrylic acid compounds, epoxy group-containing (meth)acrylic acid ester compounds such as glycidyl (meth)acrylate; maleimide compounds such as maleimide, N-methylmaleimide and N-phenylmaleimide; α,β-unsaturated carboxylic acid compounds, such as maleic acid, phthalic acid and itaconic acid, and anhydrides thereof (for example, maleic anhydride). It is possible to use one of these monomer components in isolation, or a combination of two or more types thereof. Of these, aromatic vinyl compounds, vinyl cyanide compounds, (meth)acrylic acid ester compounds and (meth)acrylic acid compounds are preferred from the perspectives of mechanical properties and surface appearance, and (meth)acrylic acid ester compounds are more preferred. Specific examples of (meth)acrylic acid ester compounds include methyl (meth)acrylate, ethyl (meth)acrylate, butyl (meth)acrylate, cyclohexyl (meth)acrylate and octyl (meth)acrylate.

From the perspectives of impact resistance and surface appearance, the graft copolymer copolymerized with the rubber component is preferably a core/shell type graft copolymer. Of these, a core/shell type graft copolymer comprising a core layer having at least one type of rubber component selected from among a polybutadiene-containing rubber, a polybutylacrylate-containing rubber, a polyorganosiloxane rubber and an IPN composite rubber comprising a polyorganosiloxane rubber and a polyalkyl acrylate rubber and, around the core layer, a shell layer formed by copolymerizing a (meth)acrylic acid ester. The ratio of content of the rubber component in the core/shell type graft copolymer is preferably 40 mass % or more, and more preferably 60 mass % or more. In addition, the content of (meth)acrylic acid is preferably 10 mass % or more. The core/shell type copolymer in the present invention may not necessarily one in which the core layer and shell layer can be clearly differentiated, and broadly encompasses compounds obtained by graft copolymerizing a rubber component around a portion that serves as a core.

Specific preferred examples of these core/shell type graft copolymers include methyl methacrylate-butadiene-styrene copolymers (MBS), methyl methacrylate-acrylonitrile-butadiene-styrene copolymers (MARS), methyl methacrylate-butadiene copolymers (MB), methyl methacrylate-acrylic rubber copolymers (MA), methyl methacrylate-acrylic rubber-styrene copolymers (MAS), methyl methacrylate-acrylic.butadiene rubber copolymers, methyl methacrylate-acrylic.butadiene rubber-styrene copolymers and methyl methacrylate-(acrylic.silicone IPN rubber) copolymers. It is possible to use one of these rubbery polymers in isolation, or a combination of two or more types thereof.

Examples of such elastomers include "Paraloid (registered trademark, the same applies hereinafter) EXL2602", "Paraloid EXL2603", "Paraloid EXL2655", "Paraloid EXL2311", "Paraloid EXL2313", "Paraloid EXL2315", "Paraloid KM330", "Paraloid KM336P" and "Paraloid KCZ201" manufactured by Rohm and Haas Japan K.K., "Metablen (registered trademark, the same applies hereinafter) C-223A", "Metablen E-901", "Metablen S-2001" and "Metablen SRK-200" manufactured by Mitsubishi Rayon Co., Ltd., "Kane Ace (registered trademark, the same applies hereinafter) M-511", "Kane Ace M-600", "Kane Ace M-400", "Kane Ace M-580", "Kane Ace M-711" and "Kane Ace MR-01" manufactured by Kaneka Corporation, and "UBESTA XPA" manufactured by Ube Industries, Ltd.

In cases where the resin composition of the present invention contains an elastomer, the blending quantity of the elastomer is preferably 1 to 20 parts by mass, more preferably 5 to 15 parts by mass, and further preferably 8 to 12 parts by mass, relative to a total of 100 parts by mass of the thermoplastic polyester resin (A) and the thermoplastic resin (B). It is possible to use only one of these elastomers in isolation, or two or more types thereof. In cases where the composition contains two or more types of elastomer, the total quantity of these elastomers preferably falls within the range mentioned above.

[Epoxy Compound]

It is preferable for the resin composition of the present invention to further contain an epoxy compound. The epoxy compound has the function of improving hydrolysis resistance of the epoxy resin and further improving the strength and durability of welded parts of molded articles.

The epoxy compound may have one or more epoxy groups per molecule, and a glycidyl compound that is a product of a reaction between epichlorohydrin and an alcohol, phenol compound or carboxylic acid, or the like, or a compound obtained by epoxidation of an olefinic double bond may generally be used.

Specific preferred examples of the epoxy compound include bisphenol type epoxy compounds such as bisphenol A type epoxy compounds and bisphenol F type epoxy compounds, resorcin type epoxy compounds, novolac type epoxy compounds, alicyclic compound type diepoxy compounds, glycidyl ether compounds, glycidyl ester compounds and epoxidated polybutadienes.

Examples of alicyclic compound type epoxy compounds include vinylcyclohexene dioxide and dicyclopentadiene oxide.

Examples of glycidyl ether compounds include monoglycidyl ether such as methyl glycidyl ether, butyl glycidyl ether, 2-ethylhexyl glycidyl ether, decyl glycidyl ether, stearyl glycidyl ether, phenyl glycidyl ether, butylphenyl glycidyl ether and allyl glycidyl ether; and neopentyl glycol diglycidyl ether, ethylene glycol diglycidyl ether, glycerin diglycidyl ether, propylene glycol diglycidyl ether and bisphenol A diglycidyl ether.

Examples of glycidyl ester compounds include mono glycidyl ester compounds such as glycidyl benzoic acid esters and glycidyl sorbic acid esters; diglycidyl adipic acid esters, diglycidyl terephthalic acid esters and diglycidyl orthophthalic acid esters.

The epoxy compound may be a copolymer comprising a glycidyl group-containing compound as one component. Examples thereof include copolymers of glycidyl esters of α,β-unsaturated acids and one or two or more monomers selected from the group consisting of α-olefins, acrylic acid, acrylic acid esters, methacrylic acid and methacrylic acid esters.

An epoxy compound having an epoxy equivalent weight of 100 to 500 g/eq and a number average molecular weight 2,000 or less is preferred as the epoxy compound. If the epoxy equivalent weight is less than 100 g/eq, the amount of epoxy groups is too high, meaning that the viscosity of the resin composition increases and adhesion of welded parts deteriorates.

Conversely, if the epoxy equivalent weight exceeds 500 g/eq, the amount of epoxy groups decreases, meaning that the advantageous effect of improving the resistance to wet heat of the resin composition tends not to be adequately exhibited. If the number average molecular weight exceeds 2,000, compatibility with the thermoplastic polyester resin (A) decreases and the mechanical strength of a molded article tends to deteriorate.

A bisphenol A type epoxy compound or novolac type epoxy compound obtained by reacting epichlorohydrin with bisphenol A or novolac is particularly preferred as the epoxy compound.

The content of the epoxy compound is preferably 0.1 to 5 parts by mass, more preferably 0.2 to 3 parts by mass, and particularly preferably 0.2 to 2 parts by mass, relative to a total of 100 parts by mass of the thermoplastic polyester resin (A) and the thermoplastic resin (B).

[Glass Fibers]

The resin composition of the present invention preferably contains a glass filler. Examples of the glass filler include glass fibers, plate-like glass, glass beads and glass flakes. The glass filler comprises a glass composition such as A-glass, C-glass or E-glass, and E-glass (alkali-free glass) is particularly preferred from the perspective of not having an adverse effect on resin components.

Glass fibers means a substance in which the shape of a cross section obtained by cutting at an angle perpendicular to the length direction is completely circular or polygonal and has a fibrous appearance. The average fiber diameter of a single fiber of the glass fibers is generally 1 to 25 μm, and preferably 5 to 17 μm. If the average fiber diameter is less than 1 μm, the molding processing properties of the resin composition may deteriorate, and if the average fiber diameter exceeds 25 μm, the appearance of a molded resin article may deteriorate and the reinforcing effect of the fibers may not be sufficient. The glass fibers may be single fibers or a material obtained by twisting together a plurality of single fibers.

The form of the glass fibers may be a glass roving obtained by continuously winding a single fiber or winding a material obtained by twisting together a plurality of single fibers, chopped strands cut evenly to lengths of 1 to 10 mm, or milled fibers pulverized to lengths of approximately 10 to 500 μm. The glass fibers may be a combination of glass fibers having different forms.

It is preferable for the glass fibers to have heteromorphic cross-sectional shapes. Here, heteromorphic cross-sectional shape means that the flatness, which is expressed by the long axis/short axis ratio of a cross section perpendicular to the length direction of a fiber, is, for example, 1.5 to 10, preferably 2.5 to 10, more preferably 2.5 to 8, and particularly preferably 2.5 to 5.

Glass beads are preferably spheres having outer diameters of 10 to 100 μm, and glass flakes are preferably flakes having a thickness of 1 to 20 μm and a length of one side of 0.05 to 1 mm.

The glass filler may be subjected to a surface treatment using a silane compound, an epoxy compound, a urethane compound, or the like, or an oxidation treatment in order to improve compatibility with resin components, as long as the properties of the resin composition of the present invention are not significantly impaired.

The blending quantity of the glass filler is preferably 10 to 100 parts by mass, more preferably 10 to 85 parts by mass, further preferably 20 to 70 parts by mass, particularly preferably 30 to 65 parts by mass, and most preferably 40 to 60 parts by mass, relative to a total of 100 parts by mass of the thermoplastic polyester resin (A) and the thermoplastic resin (B).

It is possible to use only one of these glass fillers in isolation, or two or more types thereof. In cases where the composition contains two or more types of glass filler, the total quantity of these glass fillers preferably falls within the range mentioned above.

[Auxiliary Flame Retardant]

It is preferable for the resin composition of the present invention to contain an auxiliary flame retardant in combination with a flame retardant. Examples of the auxiliary flame retardant include copper oxide, magnesium oxide, zinc oxide, molybdenum oxide, zirconium oxide, tin oxide, iron oxide, titanium oxide, aluminum oxide, antimony compounds and zinc borate, and two or more of these may be used in combination. Of these, antimony compounds and zinc borate are preferred from the perspective of superior flame retardancy.

Examples of antimony compounds include antimony trioxide ($Sb_2O_3$), antimony pentoxide ($Sb_2O_5$) and sodium antimonate. In particular, in cases where a halogenated flame retardant is used, use of antimony trioxide is preferred from the perspective of achieving a synergistic effect with the flame retardant.

In cases where a halogenated flame retardant and an antimony compound are used in combination, the overall mass concentration of halogen atoms derived from the halogenated flame retardant and antimony atoms derived from the antimony compound is preferably 5 to 16 mass %, and more preferably 6 to 15 mass %. If this overall mass concentration is less than 5 mass %, flame retardancy tends to deteriorate, and if this overall mass concentration exceeds 16 mass %, mechanical strength and tracking resistance may deteriorate. The mass ratio of halogen atoms and antimony atoms (halogen atoms/antimony atoms) is preferably 0.3 to 5, and more preferably 0.3 to 4.

The content of the auxiliary flame retardant is preferably 0.5 to 20 parts by mass, more preferably 0.7 to 18 parts by mass, and further preferably 1 to 15 parts by mass, relative to a total of 100 parts by mass of the thermoplastic polyester resin (A) and the thermoplastic resin (B).

In addition, in cases where a halogenated flame retardant is used in the present invention, a combination of an antimony compound mentioned above and zinc borate may be used as the auxiliary flame retardant. Zinc borate improves flame retardancy, like antimony compounds, and also exhibits the advantageous effects of improving the comparative tracking index (CTI) and improving insulation properties.

In cases where zinc borate is used, the content thereof is preferably a proportion of 0.3 to 1 (in terms of mass ratio), and more preferably 0.4 to 0.8, relative to the halogenated flame retardant.

[Stabilizer]

It is preferable for the resin composition of the present invention to contain a stabilizer.

The stabilizer can be selected from a variety of stabilizers, such as a phosphorus stabilizer, a sulfur-type stabilizer or a phenolic stabilizer. Phosphorus stabilizers and phenollic stabilizers are particularly preferred.

The content of the stabilizer is preferably 0.001 to 2 parts by mass relative to a total of 100 parts by mass of the thermoplastic polyester resin (A) and the thermoplastic resin (B). If the content of the stabilizer is less than 0.001 parts by mass, an improvement in the thermal stability of the resin composition can hardly be expected, and a decrease in molecular weight and a deterioration in color tone readily occur when the composition is molded. If the content of the stabilizer exceeds 2 parts by mass, the quantity thereof becomes excessive, silvering occurs, and a deterioration in color tone readily occurs. The content of the stabilizer is more preferably 0.01 to 1 part by mass, and further preferably 0.05 to 0.5 parts by mass.

Examples of phosphorus stabilizers include phosphorus acid, phosphoric acid, phosphorus acid esters and phosphoric acid esters. Of these, organic phosphate compounds, organic phosphite compounds and organic phosphonite compounds are preferred, and organic phosphate compounds are particularly preferred.

A compound represented by general formula (1) below is preferred as the organic phosphate compound.

[C1]

$$O{=}P(OH)_n(OR^1)_{3-n} \quad (1)$$

(In general formula (1), $R^1$ is an alkyl group or an aryl group. n denotes an integer between 0 and 2. In cases where n is 0, the three $R^1$ groups may be the same or different from each other, and in cases where n is 1, the two $R^1$ groups may be the same or different from each other.)

In general formula (1) above, $R^1$ denotes an alkyl group or an aryl group, but $R^1$ is more preferably an alkyl group that has 1 or more, and preferably 2 or more carbon atoms, and generally 30 or fewer, and preferably 25 or fewer carbon atoms, or an aryl group that has 6 or more, and generally 30 or fewer carbon atoms. $R^1$ is preferably an alkyl group rather than an aryl group. In cases where two or more $R^1$ groups are present, the $R^1$ groups may be the same or different from each other.

A more preferred organic phosphate compound represented by general formula (1) is a long chain alkyl acid phosphate compound in which $R^1$ has 8 to 30 carbon atoms. Specific examples of alkyl groups having 8 to 30 carbon atoms include octyl groups, 2-ethylhexyl groups, isooctyl groups, nonyl groups, isononyl groups, decyl groups, isodecyl groups, dodecyl groups, tridecyl groups, isotridecyl groups, tetradecyl groups, hexadecyl groups, octadecyl groups, eicosyl groups and triacontyl groups.

Examples of long chain alkyl acid phosphates include octyl acid phosphate, 2-ethylhexyl acid phosphate, decyl acid phosphate, lauryl acid phosphate, octadecyl acid phosphate, oleyl acid phosphate, behenyl acid phosphate, phenyl acid phosphate, nonylphenyl acid phosphate, cyclohexyl acid phosphate, phenoxyethyl acid phosphate, alkoxy polyethylene glycol acid phosphates, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate and bis(nonylphenyl) acid phosphate.

Of these, octadecyl acid phosphate is preferred, and the product "ADK STAB AX-71" manufactured by ADEKA Corporation is commercially available as this compound.

The content of phosphorus stabilizer represented by general formula (1) above is preferably 0.001 to 1 part by mass, more preferably 0.01 to 0.6 parts by mass, and further preferably 0.05 to 0.4 parts by mass, relative to a total of 100 parts by mass of the thermoplastic polyester resin (A) and the thermoplastic resin (B).

In cases where the thermoplastic polyester resin (A) is a polybutylene terephthalate and the thermoplastic resin (B) is a polycarbonate resin, blending a phosphorus stabilizer represented by the general formula above is particularly preferable in terms of regulating a transesterification reaction between these components as appropriate.

Examples of phenolic stabilizers include preferably a hindered phenolic stabilizer such as pentaerythritol tetrakis[3-(3,5-di-tert-butyl-4-hydroxyphenyl) propionate], octadecyl-3-(3,5-di-tert-butyl-4-hydroxyphenyl) propionate, thiodiethylene-bis[3-(3,5-di-tert-butyl-4-hydroxyphenyl) propionate], N,N'-hexane-1,6-diyl-bis[3-(3,5-di-tert-butyl-4-hydroxyphenyl)propionamide], 2,4-dimethyl-6-(1-methylpentadecyl)phenol, diethyl[[3,5-bis(1,1-dimethylethyl)-4-hydroxyphenyl]methyl]phosphonate, 3,3',3'',5,5',5''-hexatert-butyl-a,a',a''-(mesitylene-2,4,6-triyl)tri-p-cresol, 4,6-bis(octylthiomethyl)-o-cresol, ethylene-bis(oxyethylene)-bis[3-(5-tert-butyl-4-hydroxy-m-tolyl) propionate], hexamethylene-bis[3-(3,5-di-tert-butyl-4-hydroxyphenyl) propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazine-2-ylamino)phenol, 2-[1-(2-hydroxy-3,5-di-tert-pentylphenyl)ethyl]-4,6-di-tert-pentylphenyl acrylate.

Of these, pentaerythritol tetrakis[3-(3,5-di-tert-butyl-4-hydroxyphenyl) propionate] and octadecyl-3-(3,5-di-tert-butyl-4-hydroxyphenyl) propionate are preferred. Specific examples of this type of phenolic antioxidant include "Irganox 1010" and "Irganox 1076" (product names, the same applies hereinafter) manufactured by BASF SE and "ADK STAB AO-50" and "ADK STAB AO-60" (product names, the same applies hereinafter) manufactured by ADEKA Corporation.

It is possible to incorporate a single hindered phenolic stabilizer or a combination of two or more arbitrary types thereof combined at arbitrary proportions.

The content of the phenolic stabilizer is preferably 0.01 to 1 part by mass relative to a total of 100 parts by mass of the thermoplastic polyester resin (A) and the thermoplastic resin (B). If this content is less than 0.01 parts by mass, thermal stability tends to deteriorate. If this content exceeds 1 part by mass, the amount of gas generated may increase. This content is more preferably 0.05 to 0.8 parts by mass, and further preferably 0.1 to 0.6 parts by mass.

In the present invention, using a combination of a phosphorus stabilizer represented by general formula (1) above and a phenolic stabilizer is preferable from the perspectives of retention properties and heat resistance.

[Release Agent]

It is preferable for the resin composition of the present invention to further contain a release agent. Release agents that are known and commonly used for thermoplastic polyester resins may be utilized as the release agent. Of these, at least one type of release agent selected from among polyolefin compounds, fatty acid ester compounds and silicone compounds is preferred.

Examples of polyolefin compounds include compounds selected from among paraffin waxes and polyethylene waxes, and of these, compounds having mass average molecular weights of 700 to 10,000, and especially 900 to 8,000, are preferred. In addition, modified polyolefin compounds obtained by introducing hydroxyl groups, carboxyl groups, acid anhydride groups, epoxy groups, or the like, into side chains are particularly preferred.

Examples of fatty acid ester compounds include fatty acid esters, such as glycerol fatty acid esters, sorbitan fatty acid esters and pentaerythritol fatty acid esters, and partially saponified products thereof. Of these, mono- and di-fatty acid esters constituted from fatty acids having 11 to 28 carbon atoms, and preferably 17 to 21 carbon atoms, are preferred. Specific examples thereof include glycerol monostearate, glycerol monobehenate, glycerol dibehenate, glycerol-12-hydroxymonostearate, sorbitan monobehenate, pentaerythritol distearate and pentaerythritol tetrastearate.

A modified compound is preferred as the silicone compound from perspectives such as compatibility with the thermoplastic polyester resin (A). Examples of modified silicone oils include silicone oils obtained by introducing organic groups into side chains of polysiloxanes and silicone oils obtained by introducing organic groups at one or both terminals of polysiloxanes. Examples of organic groups to be introduced into the silicone compound include epoxy groups, amino groups, carboxyl groups, carbinol groups, methacrylic groups, mercapto groups and phenol groups, and epoxy groups are preferred. A silicone oil obtained by introducing epoxy groups into side chains of a polysiloxane is particularly preferred as the modified silicone oil.

The content of the release agent is preferably 0.05 to 2 parts by mass relative to a total of 100 parts by mass of the thermoplastic polyester resin (A) and the thermoplastic resin (B). If this content is less than 0.05 parts by mass, surface properties tend to deteriorate as a result of release defects during melt mold processing. If this content exceeds 2 parts by mass, the kneading workability of the resin composition may deteriorate and the surface of a molded article may become foggy. The content of the release agent is preferably 0.1 to 1.5 parts by mass, and more preferably 0.3 to 1.0 parts by mass.

[Other Contained Components]

The resin composition of the present invention may contain a variety of additives other than those mentioned above as long as the advantageous effect of the present invention is not significantly impaired. Examples of such additives include ultraviolet radiation absorbers, fillers other than glass fillers, anti-static agents, anti-fogging agents, dyes and pigments, fluorescent whitening agents, lubricants, anti-blocking agents, fluidity improving agents, plasticizers, dispersing agents and antimicrobial agents. It is possible to use a combination of two or more types of these.

Talc is particularly preferred as filler other than the glass fillers because blending talc can improve plating productivity in LDS.

The method for producing the resin composition of the present invention is not particularly limited, and publicly known methods for producing thermoplastic polyester resin compositions can be widely used. Specifically, it is possible to produce the resin composition by pre-mixing the components using a variety of mixing machines, such as a tumbler or Henschel mixer, and then melt kneading by means of a Banbury mixer, a roller, a Brabender, a uniaxial kneading-extruder, a biaxial kneading-extruder, a kneader, or the like.

It is also possible to produce the resin composition of the present invention without pre-mixing the components or by pre-mixing only some of the components, and then supplying to an extruder by means of a feeder and carrying out melt kneading.

It is also possible to produce the resin composition of the present invention by forming a master batch from the resin composition obtained by pre-mixing some of the components and supplying these premixed components to an extruder and melt kneading, then mixing this master batch with the remaining components and melt kneading.

The method for producing a molded resin article from the resin composition of the present invention is not particularly limited, and it is possible to use a molding method routinely used for thermoplastic polyester resins, that is, an ordinary injection molding method, an ultra-high-speed injection molding method, an injection compression molding method, a two-color molding method or a gas assisted hollow molding method, a molding method involving use of a heat insulating mold, a molding method involving use of a rapidly heated mold, a foaming molding method (including supercritical fluids), an insert molding method, an IMC (in-mold coating) molding method, an extrusion molding method, a sheet molding method, a thermoforming method, a rotational molding method, a lamination molding method or a press molding method. In addition, it is possible to select a molding method involving the use of a hot runner method. Injection molding is particularly preferred.

[Laser Direct Structuring]

Plating is formed on the surface of a molded resin article by means of laser direct structuring. The molded resin article may have any shape, and may be flat, partially or completely curved, or a complex three-dimensional shape.

The molded resin article is irradiated with a laser, but the laser is not particularly limited, and it is possible to select a publicly known laser, such as a YAG laser or excimer laser, as appropriate. Of these, a YAG laser is preferred. The wavelength of the laser is not particularly limited. A preferred wavelength range is 200 to 1,200 nm. This wavelength range is particularly preferably 800 to 1,200 nm.

When irradiated with the laser, an activated metal layer is formed only on those irradiated regions of the surface of the molded article, and the surface is roughened in such a way that is advantageous for subsequent metal plating. The molded article is then immersed in a plating liquid, with or without having been subjected to a cleaning step, plating is then carried out by means of electroless plating (or electroplating) using copper, nickel, gold, silver or palladium, and preferably using copper, and a metal layer is formed only on those regions that were irradiated with the laser.

In the present invention, the molded resin article is not limited to finished products, and may include a variety of components, but by using laser direct structuring on a molded resin article having characteristics such as impact resistance, rigidity and heat resistance as well as low anisotropy and low warpage, it is possible to form a circuit having a circuit spacing therebetween of 1 mm or less, and especially 150 μm or less (the lower limit for this gap is not particularly limited, but is, for example, 30 μm or more). Therefore, the present invention is extremely effective for a variety of portable terminals, such as smartphones and tablets, hearing aids, devices for medical and dental treatment/surgery, a variety of sensors, motor vehicle devices such as steering wheel switches, and components for these applications.

EXAMPLES

The present invention will now be explained in greater detail through the use of examples. However, it should be understood that the present invention is not limited to the examples given below.

The components used in the examples and comparative examples below are as shown in Table 1 below.

TABLE 1

| Component | Symbol | |
|---|---|---|
| Polyester resin (A) | PBT | Polybutylene terephthalate resin (water absorption rate: 0.09 mass %) Manufactured by Mitsubishi Engineering-Plastics Corporation, Product name: Novaduran (registered trademark) 5008 Intrinsic viscosity: 0.85 dl/g, terminal carboxyl group amount: 15 eq/ton |
| | PBT/I | Polybutylene terephthalate resin containing 10 mol. % of isophthalic acid (water absorption rate: 0.11 mass %) Manufactured by Mitsubishi Engineering-Plastics Corporation, Product name: Novaduran (registered trademark) 5605 Intrinsic viscosity: 0.84 dl/g, terminal carboxyl group amount: 15 eq/ton |
| Resin (B) | PA | Polyamide 6 resin (water absorption rate: 1.6 mass %) Manufactured by Ube Industries, Ltd., product name: UBE Nylon 1010X1 Relative viscosity: 2.2 |
| | PC | Polycarbonate resin (water absorption rate: 0.24 mass %) Manufactured by Mitsubishi Engineering-Plastics Corporation, Product name: Novarex (registered trademark) 7030PJ Viscosity average molecular weight Mv: 30,000 |
| | PET | Polyethylene terephthalate resin (water absorption rate: 0.10 mass %) Manufactured by Mitsubishi Chemical Corporation, product name: Novapet PBK1 Intrinsic viscosity: 0.64 dl/g, terminal carboxyl group amount: 36 eq/ton |
| LDS agent (C) | LDS-Cu | Copper-chromium oxide ($CuCr_2O_4$) Manufactured by Shepherd Color Company, product name: Black-1G |
| | LDS-Sn | Antimony-tin oxide Manufactured by Keeling & Walker, product name: Stanostat CP5C |
| Flame retardant (D) | FR-PPE | Brominated polyphenylene ether Manufactured by DKS Co., Ltd., product name: Pyroguard SR-460B Bromine concentration: 64 mass %, Mw: 4,445, Mn: 1,092 |
| | FR-PC | Tetrabromobisphenol-A polycarbonate Manufactured by Mitsubishi Gas Chemical Company, Inc., product name: FR-53 Bromine concentration: 53 mass %, Mw: approximately 3,000 |
| | FR-PB | Pentabromobenzyl polyacrylate Manufactured by ICL, product name FR-1025 Bromine concentration: 70 mass %, Mw: 80,000 |
| | FR-EP | Polybrominated epoxy resin Manufactured by Woojin KOREA, product name: CXB-2000H Bromine concentration: 52 mass %, Mw: 18,000 |
| | FR-PS | Polybromostyrene Manufactured by Chemtura Corporation, product name: Firemaster PBS-64HW Bromine concentration: 64 mass %, Mw: 60,000 |
| Sb compound | Sb | Antimony trioxide Manufactured by Suzuhiro Chemical Co., Ltd., product name: Fire Cut AT-3CN |
| Elastomer | EL | Core/shell type graft copolymer of polybutyl acrylate (core)/polymethyl methacrylate (shell) Manufactured by Rohm and Haas, product name: EXL-2313 |
| Glass fiber | GF | Manufactured by Nippon Electric Glass Co., Ltd., product name: T-127 Average fiber diameter: 13.5 μm, number average fiber length: 3 mm Treated with novolac epoxy resin |
| Talc | TLC | Manufactured by Hayashi Kasei Co., Ltd., product name: Hicontalc HS-T0.5 Average particle diameter: 4 μm, Compressed talc, apparent specific gravity: 0.5 g/cc |
| Epoxy compound | EPO | Bisphenol A-diglycidyl ether-type epoxy compound Manufactured by Shell, product name: Epikote 1003 |
| Stabilizer | SA1 | Phosphorus stabilizer Mixture of monostearyl acid phosphate and distearyl acid phosphate Manufactured by ADEKA Corporation, product name: ADK STAB AX-71 |
| | SA2 | Phenolic stabilizer pentaerythritol-tetrakis[3-(3,5-di-tert-butyl-4-hydroxyphenyl)propionate] Manufactured by ADEKA Corporation, product name: ADK STAB AO-60 |
| Release agent | MR | Paraffin wax Manufactured by Nippon Seiro Co., Ltd., product name: HNP0190 |

Examples 1 to 18 and Comparative Examples 1 to 8

[Production of Laser Transmission Side Molded Body]

Resin composition pellets were obtained by blending the components shown in Table 1 above except the glass fibers at the quantities (parts by mass) shown in Table 2 below, kneading the components by use of a 30 mm vent type biaxial extruder ("TEX30α" manufactured by Japan Steel Works, Ltd.), while supplying the glass fibers by means of a side feeder, at an extruder barrel preset temperature of 260° C. and a screw rotation speed of 200 rpm so as to discharge the kneaded components in the form of a strand, rapidly cooling the strand in a water bath, and then forming pellets by means of a pelletizer.

The obtained resin composition pellets were dried for 5 hours at 120° C., and then injection molded into ISO multipurpose test pieces (thickness 4 mm) and flammability test pieces (thickness 0.75 mm) using an injection molding machine ("NEX80" manufactured by Nissei Plastic Industrial Co., Ltd.) at a cylinder temperature of 250° C. and a mold temperature of 80° C.

[Bending Strength and Impact Strength]

In accordance with ISO 178, the bending strength (units: MPa) was measured using the ISO multipurpose test piece (thickness 4 mm) mentioned above.

The notched Charpy impact strength (units: $kJ/m^2$) was measured in accordance with ISO 179 specifications using the ISO multipurpose test piece (thickness 4 mm) mentioned above.

[Flame Retardancy]

Flame retardancy was evaluated in the following way.

Flame retardancy (UL94):

In accordance with the Underwriters Laboratories Subject (UL94) method, flame retardancy was tested using five test pieces (thickness 0.75 mm), and classified as V-0, V-1, V-2 or NR (not rated).

[LDS Performance]

The obtained resin composition pellets were injection molded into the flat-plate test pieces measuring 100 mm×100 mm×3 mm thick using an injection molding machine ("NEX80" manufactured by Nissei Plastic Industrial Co., Ltd.) at a cylinder temperature of 250° C. and a mold temperature of 80° C.

A 10 mm×10 mm region of an obtained flat-plate test piece was irradiated at an output of 80%, a frequency of 10 kHz and a speed of 1 m/s using a Trumpf VMc1 laser irradiation device manufactured by Trumpf Inc. (YAG laser having a wavelength of 1,064 nm and a maximum output of 15 W). A plating process was then carried out at 48° C. in an Enplate LDS CU 400 PC electroless plating bath manufactured by Enthone Inc. Plating performance (LDS performance) was evaluated by visually observing the thickness of copper plated for a duration of 20 minutes, and appraised according to the criteria below.

A: Even better appearance than B below

B: Extremely good appearance (deep copper color and thickly plating produced)

C: Good appearance

D: Plating produced, but somewhat thin (although at a practical level)

X: Plating not produced at all

[Alkali Resistance]

Alkali resistance was evaluated in the following way.

Figure 2:
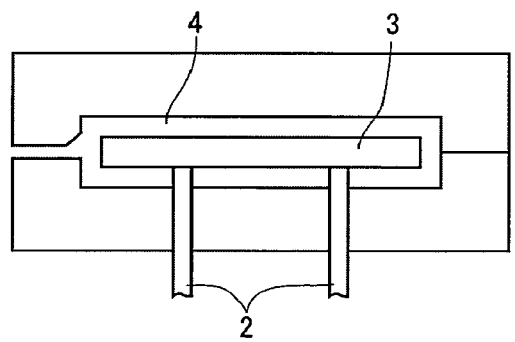
FIG. 2 is an explanatory diagram of a cross-section of a metal mold cavity in which an insert object is supported by a support pin.
Figure 3:
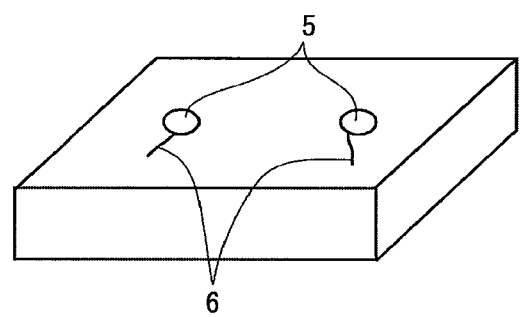
FIG. 3 is a schematic diagram of an insert-molded article on which two weld lines are formed in support pin marks.

Using a TH60 R5VSE vertical injection molding machine manufactured by Nissei Plastic Industrial Co., Ltd. at a cylinder temperature of 250° C. and a mold temperature of 80° C., the obtained resin composition pellets were insert molded by being supplied to a mold cavity 4 obtained by inserting the insert object 1 (rectangular SUS-iron plate, height 16 mm×width 33 mm×thickness 3 mm) shown in FIG. 1 using support pins 2, as shown in FIG. 2 (insert iron piece 3). The insert molded article shown in FIG. 3 (height 18 mm×width 35 mm×thickness 5 mm) was produced by insert molding. This insert molded article had a resin part thickness of 1 mm. In the insert molded article, two weld lines 6 were formed on support pin marks 5. The thus obtained insert molded article was immersed at room temperature in an aqueous solution of NaOH having a concentration of 10 mass %. Following the immersion, it was periodically confirmed visually whether or not cracking had occurred, and the time (hr) until cracking occurred was measured. A longer time means better alkali resistance of the test piece.

These results are also shown in Table 2 below.

TABLE 2

| Component | Symbol | Example 1 | 2 | 3 | 4 | 5 | 6 | 7 | 8 | 9 |
|---|---|---|---|---|---|---|---|---|---|---|
| Polyester resin (A) | PBT | 60 | 90 | 60 | 30 | 60 | 30 | 70 | 50 | 50 |
|  | PBT/I |  |  |  | 30 |  | 30 |  |  |  |
| Resin (B) | PA | 40 | 10 | 40 | 40 | 40 | 40 |  |  |  |
|  | PC |  |  |  |  |  |  | 30 | 50 | 50 |
|  | PET |  |  |  |  |  |  |  |  |  |
| LDS agent (C) | LDS-Cu | 13.1 | 13.1 | 13.1 | 13.1 |  |  | 13.1 | 8.8 | 9.6 |
|  | LDS-Sn |  |  |  |  | 16.2 | 13.5 |  |  |  |
| Flame retardant (D) | FR-PPE |  |  |  |  |  |  |  |  |  |
|  | FR-PC |  |  |  |  |  |  |  |  |  |
|  | FR-PB |  |  |  |  |  |  |  |  |  |
|  | FR-EP |  |  |  |  |  |  |  |  |  |
|  | FR-PS |  |  |  |  |  |  |  |  |  |
| Sb compound | Sb |  |  |  |  |  |  |  |  |  |
| Elastomer | EL |  |  |  |  |  |  |  |  | 9.6 |
| Glass fiber | GF | 49.1 | 49.1 | 60.0 | 49.1 | 60.7 | 50.4 | 48.9 |  |  |
| Talc | TLC |  |  | 20.0 |  | 20.0 |  |  |  |  |
| Epoxy | EPO | 0.4 | 0.4 | 0.4 | 0.4 | 4.1 | 3.4 |  |  |  |
| Stabilizer | SA1 |  |  |  |  |  |  | 0.2 | 0.1 | 0.1 |
|  | SA2 | 0.5 | 0.5 | 0.5 | 0.5 | 0.4 | 0.3 | 0.5 | 0.3 | 0.4 |
| Release agent | MR | 0.5 | 0.5 | 0.5 | 0.5 | 0.4 | 0.3 | 0.5 | 0.3 | 0.4 |
| LDS performance |  | B | D | A | A | D | D | D | C | C |
| Bending strength (MPa) |  | 170 | 168 | 171 | 177 | 170 | 176 | 161 | 80 | 85 |
| Notched Charpy impact strength (kJ/m$^2$) |  | 5.1 | 4.5 | 5.1 | 4.3 | 5.1 | 4.3 | 4.4 | 17 | 47 |
| Flame retardancy (0.75 mmt) |  | NR | NR | NR | NR | NR | NR | NR | NR | NR |
| Alkali resistance (hr) |  | 70 | 5 | 80 | 70 | 140 | 135 | 6 | 4 | 3 |

TABLE 3

| Component | Symbol | Example 10 | 11 | 12 | 13 | 14 | 15 | 16 | 17 | 18 |
|---|---|---|---|---|---|---|---|---|---|---|
| Polyester resin (A) | PBT | 60 | 60 | 30 | 60 | 70 | 60 | 60 | 60 | 60 |
|  | PBT/I |  |  | 30 |  |  |  |  |  |  |
| Resin (B) | PA | 40 | 40 | 40 | 40 |  | 40 | 40 | 40 | 40 |
|  | PC |  |  |  |  | 30 |  |  |  |  |
|  | PET |  |  |  |  |  |  |  |  |  |

TABLE 3-continued

| | | Example | | | | | | | | |
|---|---|---|---|---|---|---|---|---|---|---|
| Component | Symbol | 10 | 11 | 12 | 13 | 14 | 15 | 16 | 17 | 18 |
| LDS agent (C) | LDS-Cu | 17.8 | 17.8 | 17.8 | 17.8 | 17.8 | 17.7 | 17.7 | 17.7 | 17.7 |
| | LDS-Sn | | | | | | | | | |
| Flame retardant (D) | FR-PPE | 22.3 | 22.3 | 22.3 | 11.1 | 22.1 | | | | |
| | FR-PC | | | | | | 22.1 | | | |
| | FR-PB | | | | | | | 22.1 | | |
| | FR-EP | | | | | | | | 22.1 | |
| | FR-PS | | | | | | | | | 22.1 |
| Sb compound | Sb | 8.9 | 8.9 | 8.9 | 4.5 | 8.9 | 8.8 | 8.8 | 8.8 | 8.8 |
| Elastomer | EL | | | | | | | | | |
| Glass fiber | GF | 66.8 | 44.5 | 66.8 | 66.8 | 66.8 | 44.2 | 44.2 | 44.2 | 44.2 |
| Talc | TLC | | 22.3 | | | | 22.1 | 22.1 | 22.1 | 22.1 |
| Epoxy | EPO | 5.6 | 5.6 | 5.6 | 5.6 | | 5.6 | 5.6 | 5.6 | 5.6 |
| Stabilizer | SA1 | | | | | | | | | |
| | SA2 | 0.7 | 0.7 | 0.7 | 0.7 | 0.7 | 0.4 | 0.4 | 0.4 | 0.4 |
| Release agent | MR | 0.7 | 0.7 | 0.7 | 0.7 | 0.7 | 0.4 | 0.4 | 0.4 | 0.4 |
| LDS performance | | C | B | B | B | C | D | C | D | D |
| Bending strength (MPa) | | 166 | 142 | 172 | 117 | 164 | 143 | 141 | 147 | 145 |
| Notched Charpy impact strength (kJ/m$^2$) | | 4.6 | 5 | 4.9 | 4.4 | 4.5 | 4.4 | 4.5 | 4.3 | 4.4 |
| Flame retardancy (0.75 mmt) | | V-0 | V-0 | V-0 | V-2 | V-0 | V-0 | V-0 | V-0 | V-0 |
| Alkali resistance (hr) | | 140 | 140 | 130 | 65 | 5 | 130 | 130 | 130 | 130 |

TABLE 4

| | | Comparative Example | | | | | | | |
|---|---|---|---|---|---|---|---|---|---|
| Component | Symbol | 1 | 2 | 3 | 4 | 5 | 6 | 7 | 8 |
| Polyester resin (A) | PBT | 100 | 100 | 100 | 70 | 100 | 100 | 100 | 100 |
| | PBT/I | | | | | | | | |
| Resin (B) | PA | | | | | | | | |
| | PC | | | | | | | | |
| | PET | | | | 30 | | | | |
| LDS agent (C) | LDS-Cu | 13.0 | 13.0 | 13.0 | 13.0 | 16.9 | 16.9 | 16.9 | 16.9 |
| | LDS-Sn | | | | | | | | |
| Flame retardant (D) | FR-PPE | | | | | | | | 70.0 |
| | FR-PC | | | | | 21.1 | | | |
| | FR-PB | | | | | | 21.1 | | |
| | FR-EP | | | | | | | | |
| | FR-PS | | | | | | | | |
| Sb compound | Sb | | | | | 8.4 | 8.4 | 8.4 | 8.4 |
| Elastomer | EL | | | | | | | | |
| Glass fiber | GF | | 48.9 | | 48.9 | 63.3 | 63.3 | 63.3 | 63.3 |
| Talc | TLC | 48.9 | | | | | | | |
| Epoxy | EPO | | | | | | | | |
| Stabilizer | SA1 | | | | | | | | |
| | SA2 | 0.5 | 0.5 | 0.5 | 0.5 | 0.6 | 0.6 | 0.6 | 0.6 |
| Release agent | MR | 0.5 | 0.5 | 0.5 | 0.5 | 0.6 | 0.6 | 0.6 | 0.6 |
| LDS performance | | C | X | X | X | X | X | X | X |
| Bending strength (MPa) | | 95 | 164 | 83 | 163 | 150 | 152 | 154 | 142 |
| Notched Charpy impact strength (kJ/m$^2$) | | 3.3 | 4.0 | 1.4 | 4.2 | 4.2 | 4.3 | 4.3 | 4 |
| Flame retardancy (0.75 mmt) | | NR | NR | NR | NR | V-0 | V-0 | NR | V-0 |
| Alkali resistance (hr) | | 1 | 1 | 1 | 1 | 1 | 1 | 1 | 20 |

INDUSTRIAL APPLICABILITY

The polyester resin composition for laser direct structuring of the present invention exhibits high platability and excellent mechanical properties, and can therefore be used particularly advantageously for a variety of portable terminals, such as smartphones and tablets, hearing aids, devices for medical and dental treatment/surgery, a variety of sensors, motor vehicle devices such as steering wheel switches, and components for these applications, and therefore the polyester resin composition possesses extremely high industrial applicability.

REFERENCE SIGNS LIST

1 Insert iron piece
2 Support pin
3 Insert iron piece inserted into mold
4 Cavity
5 Support pin mark
6 Weld line

The invention claimed is:
1. A polyester resin composition, comprising:
a thermoplastic polyester resin (A) comprising a polybutylene terephthalate homopolymer and a modified polybutylene terephthalate resin;

a thermoplastic resin (B) having a water absorption rate of 0.15 mass % or more and 5 mass % or less as measured by an ISO 62A method; and
a laser direct structuring additive (C) at a quantity of 1 to 20 parts by mass relative to a total of 100 parts by mass of thermoplastic polyester resin (A) and thermoplastic resin (B),
wherein a content of the thermoplastic resin (B) is 1 to 40 mass % relative to a total of 100 mass % of components (A) and (B).

2. The polyester resin composition according to claim 1, wherein a content of the thermoplastic resin (B) is 5 to 40 mass % relative to a total of 100 mass % of components (A) and (B).

3. The polyester resin composition according to claim 1, wherein the laser direct structuring additive (C) is a copper-chromium oxide or an antimony-containing tin oxide.

4. The polyester resin composition according to claim 1, further comprising a flame retardant (D) at a quantity of 3 to 60 parts by mass relative to a total of 100 parts by mass of components (A) and (B).

5. The polyester resin composition according to claim 4, wherein the flame retardant (D) is a brominated polyphenylene ether.

6. The polyester resin composition according to claim 1, wherein the thermoplastic resin (B) is a polyamide resin or a polycarbonate resin.

7. The polyester resin composition according to claim 1, wherein the laser direct structuring additive (C) is a copper-chromium oxide.

8. The polyester resin composition according to claim 1, wherein the laser direct structuring additive (C) is an antimony-containing tin oxide.

9. The polyester resin composition according to claim 1, wherein the thermoplastic resin (B) is a polyamide resin.

10. The polyester resin composition according to claim 1, wherein the thermoplastic resin (B) is a polycarbonate resin.

11. The polyester resin composition according to claim 1, wherein:
thermoplastic polyester resin (A) has a water absorption rate of less than 0.15 mass % as measured by an ISO 62A method;
the content of the thermoplastic resin (B) is 10 to 50 mass % relative to a total of 100 mass % of components (A) and (B), and
thermoplastic resin (B) has a water absorption rate of 0.20 mass % to 5 mass %.

12. The polyester resin composition according to claim 11, wherein:
thermoplastic polyester resin (A) has an intrinsic viscosity of 0.3 to 2 dl/g and is selected from polybutylene terephthalate and polyethylene terephthalate; and
thermoplastic resin (B) is selected from polyamide resins, polycarbonate resins, polyoxymethylene resins, polyimide resins, polyamideimide resins, polymethylmethacrylate resins, ABS resins, and mixtures thereof.

13. The polyester resin composition according to claim 12, wherein the laser direct structuring additive (C) is a copper-chromium oxide or an antimony-containing tin oxide.

14. The polyester resin composition according to claim 1, wherein:
thermoplastic polyester resin (A) has a water absorption rate of less than 0.15 mass % as measured by an ISO 62A method and is selected from polybutylene terephthalate and polyethylene terephthalate; and
thermoplastic resin (B) is selected from polyimide resins, polycarbonate resins, polyoxymethylene resins, polyimide resins, polyamideimide resins, polymethylmethacrylate resins, ABS resins, and mixtures thereof.

15. The polyester resin composition according to claim 14, wherein the laser direct structuring additive (C) is a copper-chromium oxide or an antimony-containing tin oxide.

16. The polyester resin composition according to claim 1, wherein the modified polybutylene terephthalate resin is selected from a polyester-ether resin obtained by copolymerizing polybutylene terephthalate resin with a polyalkylene glycol, a polybutylene terephthalate resin copolymerized with a dimer acid, and a polybutylene terephthalate resin copolymerized with isophthalic acid.

17. The polyester resin composition according to claim 16, wherein the modified polybutylene terephthalate resin is a polyester-ether resin obtained by copolymerizing polybutylene terephthalate resin with polytetramethylene glycol.

18. A polyester resin composition, comprising:
a thermoplastic polyester resin (A);
a thermoplastic resin (B) having a water absorption rate of 0.15 mass % or mores measured by an ISO 62A method; and
a laser direct structuring additive (C) at a quantity of 1 to 20 parts by mass relative to a total of 100 parts by mass of thermoplastic polyester resin (A) and thermoplastic resin (B),
wherein a content of the thermoplastic resin (B) is 1 to 50 mass % relative to a total of 100 mass % of components (A) and (B),
thermoplastic polyester resin (A) has a water absorption rate of less than 0.15 mass % as measured by an ISO 62A method and is selected from polybutylene terephthalate and polyethylene terephthalate; and
thermoplastic resin (B) is a blend of a polyamide resin and a polycarbonate resin.

19. The polyester resin composition according to claim 18, wherein the laser direct structuring additive (C) is a copper-chromium oxide or an antimony-containing tin oxide.

20. A polyester resin composition, comprising:
a thermoplastic polyester resin (A);
a thermoplastic resin (B) having a water absorption rate of 0.15 mass % or more as measured by an ISO 62A method; and
a laser direct structuring additive (C) at a quantity of 1 to 20 parts by mass relative to a total of 100 parts by mass of thermoplastic polyester resin (A) and thermoplastic resin (B),
wherein a content of the thermoplastic resin (B) is 1 to 50 mass % relative to a total of 100 mass % of components (A) and (B),
thermoplastic polyester resin (A) has an intrinsic viscosity of 0.3 to 2 dl/g and is selected from polybutylene terephthalate and polyethylene terephthalate; and
thermoplastic resin (B) is a blend of a polyamide resin and a polycarbonate resin.

21. The polyester resin composition according to claim 20, wherein the laser direct structuring additive (C) is a copper-chromium oxide or an antimony-containing tin oxide.

* * * * *